E. ALSCHULER.
BATTERY HAND LAMP.
APPLICATION FILED APR. 30, 1919.
1,409,147.
Patented Mar. 14, 1922.
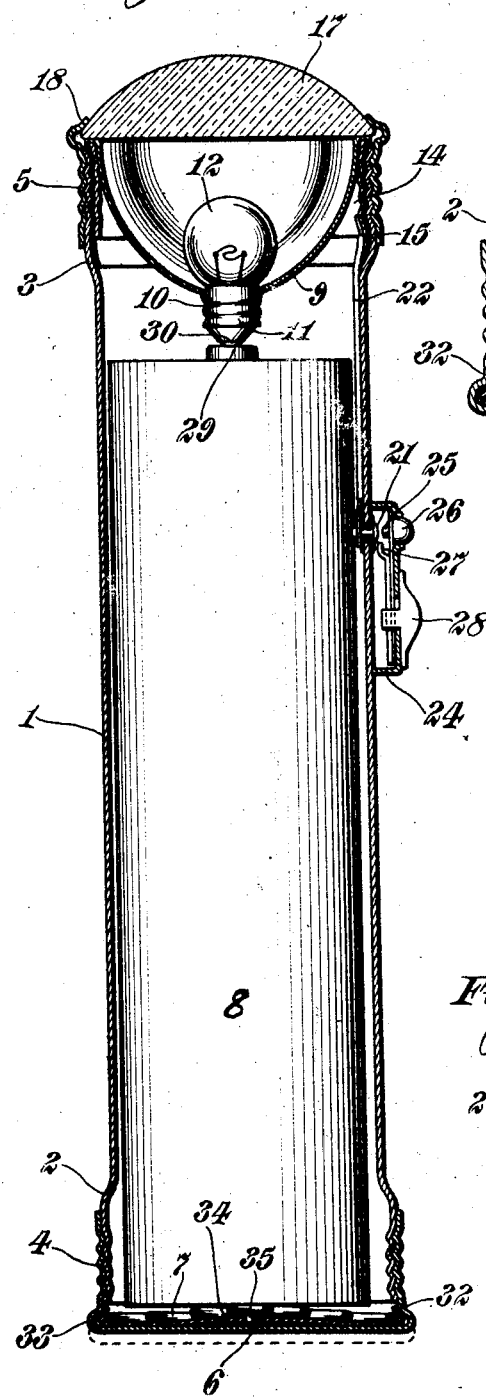
Fig. 1.
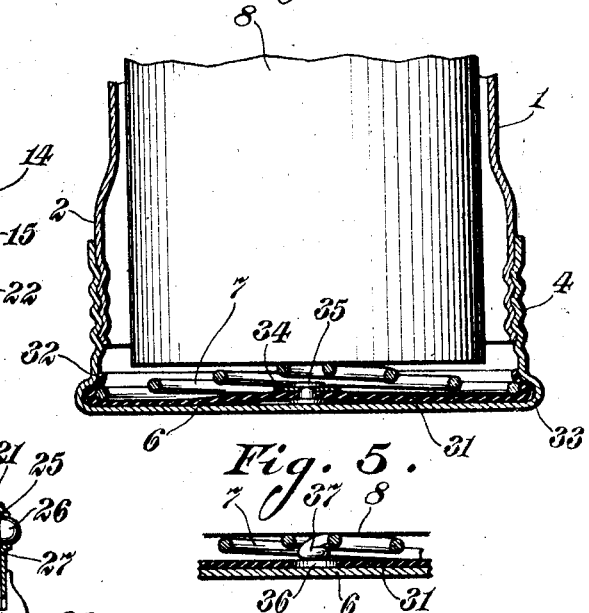
Fig. 2.
Fig. 5.
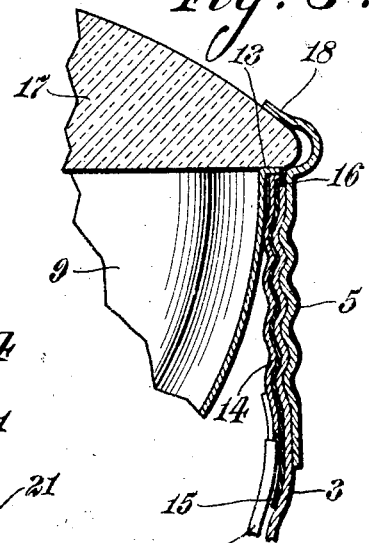
Fig. 3.
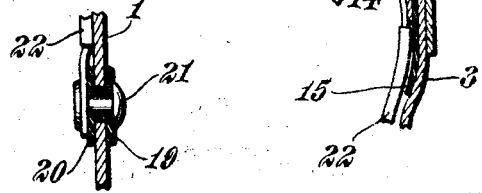
Fig. 4.
Inventor:
ERNEST ALSCHULER,
By John H. Bruninga
His Attorney

UNITED STATES PATENT OFFICE.

ERNEST ALSCHULER, OF CHICAGO, ILLINOIS, ASSIGNOR TO UNITED STATES ELECTRIC MANUFACTURING CORPORATION, OF NEW YORK, N. Y., A CORPORATION OF NEW YORK.

BATTERY HANDLAMP.

1,409,147.

Specification of Letters Patent.　　Patented Mar. 14, 1922.

Application filed April 30, 1919.  Serial No. 293,694.

*To all whom it may concern:*

Be it known that I, ERNEST ALSCHULER, a citizen of the United States, and residing at Chicago, Illinois, have invented the new and useful Improvement in Battery Handlamps, of which the following is a specification.

This invention relates to battery hand lamps.

A battery hand lamp is usually provided with a circuit closing switch which is mounted on the battery receiving casing and is adapted to normally connect the lamp and the end of the casing in circuit with the battery. The end of the casing opposite the end of the lamp is usually closed by a cap carrying a spring, which not only firmly holds the terminal of the battery in contact with the terminal of the lamp, but also itself engages and makes contact with the other terminal of the battery to complete the circuit. In the usual metal casing hand lamp, the cap not only has a metallic contact with the casing itself, but also with a spring so that the circuit is completed through the spring, the cap and the casing.

The circuit closing switch will sometimes be accidentally shifted (as when the lamp is in the tool box of an automobile), thereby closing the circuit and causing the battery to discharge.

One of the objects of this invention, therefore, is to provide a battery hand lamp, having provisions whereby the circuit may be opened to prevent accidental lighting of the lamp by the closing of the circuit through inadvertent shifting of the switch.

Another object is to provide a battery hand lamp employing means to open the circuit to prevent accidental lighting of the lamp, but which means is constructed so as to not interfere with the normal desirable operation of the circuit closing switch.

Further objects will appear from the detail description taken in connection with the accompanying drawing, in which:

Figure 1 is a longitudinal vertical section of the battery hand lamp embodying this invention;

Figure 2 is an enlarged detail of the cap end, showing the circuit open;

Figure 3 is an enlarged detail of the reflector end of the casing, showing its construction;

Figure 4 is an enlarged detail of Figure 1, showing the mounting of one of the contacts on the casing; and Figure 5 is a detail similar to Figure 2, but illustrating another embodiment of this invention.

Referring to the accompanying drawing, and more particularly to Figures 1 to 4 inclusive, 1 designates a casing of metal, having enlarged threaded ends 2 and 3, which are adapted to receive the threaded rings 4 and 5 respectively. The ring 4 has a closed end 6 forming an end cap and carrying a spring 7, of helical form, adapted to bear against and make contact with one end terminal of a battery 8 carried by the casing, it being understood that there are two or more batteries arranged end to end in a single cover or carton of paper or other light insulating material.

As more fully disclosed in application Serial No. 269,704, filed January 4, 1919, arranged at the other end of the casing is a reflector 9 which has a threaded thimble 10, adapted to receive the metallic terminal 11 of a lamp 12. This reflector has a flange 13 adapted to engage and make contact with a metallic ring 14, spaced from the end ring 3 by a ring 15 of insulating material; the rings 14 and 15 are threaded to correspond with the threaded end 3 so that the rings are arranged in nested relation within the end 3 of the casing, but whereby the contact ring 14 is insulated from the casing. The insulating ring 15 is preferably provided with an end flange 16 to form a stop and to also insulate the reflector from the end 3 of the casing.

Mounted on the flange 13 of the reflector is a lens 17 which is retained in place by a flange 18 of the ring 5; the reflector flange 13 is of smaller diameter than the ring 5 so that it will not contact with the ring and the reflector body makes a snug fit with the contact ring 15, this contact ring making a firm mechanical connection with the insulating ring 15 in order that the contact ring may be firmly retained in position.

The casing is perforated to receive washers 19 and 20 of insulating material, the latter washer having a projection to enter the aperture as shown in Figure 4, and these washers carry a contact 21 which may be riveted in place and hold the parts, including the end of an insulated lead 22 in position; the insulated lead 22 is electrically connected with the contact ring 14. Mounted on the casing is any suitable circuit closing switch, comprising, in this case, a housing 24 of metal, electrically and mechanically connected with the casing and having a pivotal contact 25 operated by a button and a sliding contact operated by a sliding thumb piece 28; these contacts are so positioned as to engage and make contact with the contact 21 connected with the contact ring 14. The other terminal 29 of the battery engages and makes contact with a central terminal 30 of the lamp.

The cap 6 has mounted thereon a disc 31 of insulating material, having a flange 32 and the cap is provided with an enlarged bead 33 at its end. The spring 7 which engages the battery terminal, is mounted in the cap, but is normally insulated therefrom by the disc 31 and its flange 32, the outer convolution of the spring engaging the flange 32 of the disc and wedging the same into the bead 33 so that the spring, insulating disc and cap are firmly held together as a unit. A small metallic disc 34 is secured to the inside face of the insulated disc 31 by a metallic rivet 35 which makes contact with the metallic end cap. The disc 34 (or the head of the rivet 35) is of sufficient diameter so that when the cap is screwed tightly on the casing, the compression of the spring will cause the inside convolution thereof, which engages the end terminal of the battery, to be pressed against and make contact with the disc 34 as shown in Figure 1 and thus connect the end terminal of the battery with the metal casing, and, therefore, with the switch contacts 25 and 27, electrically connected to the casing; when, however, the end cap is slightly unscrewed by giving it a slight turn, as shown in Figure 2, the inside convolution of the spring, while still engaging the end terminal of the battery, will move out of contact with the disc 34 so that the circuit between the end terminal of the battery and the casing is broken.

When either of the contacts 25 or 27 is moved into engagement with the contact 21, the circuit will be closed through the contact on the casing, the contact 21, the lead 22, the contact ring 14, the reflector 9, the lamp terminal 11, the lamp filament, the lamp terminal 30, the battery 8, the spring 7, the disc 34, (assuming that the cap is tightened), the cap 6, and the casing 2. If, however, the end cap 6 is given a slight turn, the contact between it and the battery will be broken so that the circuit cannot be closed at this time, by accidental shifting of the movable switch contacts 25 or 27.

It will, furthermore, be noted that the reflector, forming the lamp carrying base, is insulated from the metal casing and that this is obtained in a simple and effective manner through the provision of the contact ring insulated from the end of the casing by the simple insulating ring. Moreover, the end battery terminal can be insulated from the cap and the circuit broken by giving a turn to the cap as heretofore described.

It will further be seen that with this construction, it is possible to obtain, in a metal casing structure, either a duration or flash contact, the former being obtained by movement of the thumb piece and the latter by movement of the button 26. The movement of the thumb piece to close the circuit is a normal one forward toward the reflector end of the casing as is naturally desired in the manipulation of the lamp; this is attained by connecting the main or normal switch, arranged intermediate the ends of the casing, and the auxiliary switch at the cap end, by a fixed lead, which forms, in this embodiment, the metallic wall of the casing.

In the embodiment shown in Figure 5, the insulating disc 31 is perforated as shown at 36 and the inside convolution of the spring 7 terminates in a rearwardly projecting portion 37 adapted to enter the perforation and make contact with the metallic cap 6 when the cap is screwed tight on the casing. When, however, the cap is loosened, the terminal 37 will move out of contact with the end cap so as to break the circuit as shown in Figure 5, and, therefore, prevent accidental lighting of the lamp at this time.

It is obvious that various changes may be made in the details of construction, within the scope of the appended claims, without departing from the spirit of this invention; it is, therefore, to be understood that this invention is not to be limited to the specific construction shown and described.

Having thus described the invention, what is claimed is:

1. A battery hand lamp having a battery-receiving casing provided with a movable cap, a lamp on the casing and a circuit closing switch on the casing adapted to normally connect the lamp with the battery through the cap, characterized by means operable upon movement of the cap adapted to disconnect the same from the battery in order to prevent accidental lighting of the lamp.

2. A battery hand lamp having a metal battery-receiving casing provided with a movable metal cap in contact therewith, a lamp on the casing, and a circuit closing switch on the casing adapted to normally connect the lamp with the battery through the cap, characterized by means operable upon movement of the cap adapted to disconnect the same from the battery in order to prevent accidental lighting of the lamp.

3. A battery hand lamp having a battery-receiving casing provided with a battery-retaining cap, a lamp on the casing, and a circuit closing switch on the casing in circuit with the lamp and the cap, characterized by means operable upon movement of the cap adapted to disconnect the same from the battery in order to prevent accidental lighting of the lamp.

4. A battery hand lamp having a metal battery-receiving casing provided with a metal battery-retaining cap in contact with the casing, a lamp on the casing, a circuit closing switch in contact with the casing and connected with the lamp, characterized by means operable upon movement of the cap adapted to disconnect the same from the battery in order to prevent accidental lighting of the lamp.

5. A battery hand lamp, comprising, a metal battery-receiving casing, a lamp at one end thereof, a circuit closing switch on and electrically connected with said casing adapted to normally connect said lamp in circuit with said battery, a metal cap movably mounted on the other end of said casing, and a contact on said cap adapted upon movement thereof to one position to connect said battery with said switch through said casing as an intermediate conductor, and adapted in another position to open said circuit and prevent accidental lighting of said lamp.

6. A battery hand lamp, comprising, a metal battery-receiving casing, a lamp at one end thereof, a circuit closing switch on and electrically connected with said casing adapted upon movement towards said lamp to normally connect said lamp in circuit with said battery, a metal cap movably mounted on the other end of said casing, and a contact on said cap adapted upon movement thereof to one position to connect said battery with said switch through said casing, and adapted upon movement to another position to open said circuit and prevent accidental lighting of said lamp.

In testimony whereof I affix my signature this 28th day of April, 1919.

ERNEST ALSCHULER.